US007140462B2

(12) United States Patent
Tsuruta et al.

(10) Patent No.: US 7,140,462 B2
(45) Date of Patent: Nov. 28, 2006

(54) SUPPLEMENTAL AIR CLEANER FOR AN ALL-TERRAIN VEHICLE, AND ALL-TERRAIN VEHICLE INCORPORATING SAME

(75) Inventors: Yuuichirou Tsuruta, Saitama (JP); Masayoshi Kobayashi, Saitama (JP); Yoshihito Tokuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 229 days.

(21) Appl. No.: 10/725,943

(22) Filed: Dec. 2, 2003

(65) Prior Publication Data

US 2004/0173394 A1 Sep. 9, 2004

(30) Foreign Application Priority Data

Dec. 4, 2002 (JP) ............................ 2002-352435

(51) Int. Cl.
*B60K 13/02* (2006.01)

(52) U.S. Cl. .................... 180/68.3; 908/292; 908/233; 908/219

(58) Field of Classification Search ............... 180/68.3, 180/908, 292, 233, 219
See application file for complete search history.

(56) References Cited

U.S. PATENT DOCUMENTS 6,565,620 B1 * 5/2003 Greeson .................... 55/385.3
6,776,250 B1 * 8/2004 Kuji et al. ................. 180/68.3
6,823,956 B1 * 11/2004 Shimizu .................... 180/68.1
6,868,932 B1 * 3/2005 Davis et al. ................ 180/292
6,892,842 B1 * 5/2005 Bouffard et al. ........... 180/68.3
6,920,949 B1 * 7/2005 Matsuura et al. .......... 180/68.2

* cited by examiner

*Primary Examiner*—Christopher P. Ellis
*Assistant Examiner*—Cynthia F. Collado
(74) *Attorney, Agent, or Firm*—Carrier, Blackman & Associates, P.C.; William D.. Blackman; Joseph P. Carrier

(57) ABSTRACT

In a vehicle for off-road use, an engine is mounted on a lower portion of a body frame, a carburetor is attached to the engine, and a main air cleaner is attached to the carburetor. The carburetor is provided with an air vent unit attached thereto, for transferring atmospheric pressure to fuel in a float chamber in the carburetor, and a supplemental air cleaner is attached to the tip of the air vent unit. The supplemental air cleaner is disposed above the engine, and above and anterior to the carburetor and the main air cleaner. Since the supplemental air cleaner is substantially covered, from below, by the internal combustion engine, the carburetor, and the main air cleaner, fluids splashed up from a road surface can be blocked by these components, so that the supplemental air cleaner is substantially prevented from being exposed to splashed fluids.

11 Claims, 7 Drawing Sheets

PRIOR ART

SUPPLEMENTAL AIR CLEANER FOR AN ALL-TERRAIN VEHICLE, AND ALL-TERRAIN VEHICLE INCORPORATING SAME

CROSS-REFERENCE TO RELATED APPLICATIONS

The present application claims priority under 35 U.S.C. 119 based on Japanese patent application No. 2002-352435, filed Dec. 4, 2002.

BACKGROUND OF THE INVENTION

1. Field of the Invention

The present invention relates to a supplemental air cleaner for an all-terrain vehicle used on uneven ground. More particularly, the present invention relates to a supplemental air cleaner layout structure for an all-terrain vehicle, in which splashed fluid is substantially prevented from contacting a supplemental air cleaner.

2. Description of the Background Art

A supplemental air cleaner has been known in which an expansion chamber, having a filter, is provided in a part of an air cleaner case. A supplemental air cleaner layout structure of this type is disclosed in Japanese Unexamined Utility Model Publication No. HEI 2-94350 (e.g., see page 1, FIG. 1 of the reference).

FIG. 7 of the present application is a cross-sectional view, partly in side plan view showing the prior art supplemental air cleaner layout structure of Japanese Unexamined Utility Model Publication No. HEI 2-94350.

In the prior art structure shown in FIG. 7 of the present application, an air cleaner case 103 is attached to a carburetor 101 via an outlet tube 102, an expansion chamber 104 is provided in a part of the air cleaner case 103, and a filter member 106 is provided in the expansion chamber 104. The expansion chamber 104 and the carburetor 101 are coupled to each other with an air vent tube 107 for providing ambient atmospheric pressure to a fuel chamber in the carburetor.

When the expansion chamber 104 and the air vent tube 107 of the above-described structure are used off-road for, e.g., a vehicle for running on uneven ground, muddy water or the like from a trail surface is more likely to be splashed over the air cleaner case 103. If such muddy water intrudes into the expansion chamber 104, the muddy water eventually enters the fuel chamber of the carburetor 101 through the air vent tube 107.

When the expansion chamber 104 and the air vent tube 107 are used off-road on uneven ground, therefore, consideration should be given to the placement of the air cleaner case 103 in the vehicle, and to the placement of the expansion chamber 104 in the air cleaner case 103, such that the air cleaner case 103 is not exposed to muddy water or the like.

Although the known devices have some utility for their intended purposes, a need still exists in the art for an improved supplemental air cleaner layout structure for a vehicle for off-road use on uneven ground. In particular, there is a need for an improved supplemental air cleaner layout structure for a vehicle for off-road use on uneven ground.

SUMMARY OF THE INVENTION

It is therefore an object of the present invention to provide an improved supplemental air cleaner located and configured to substantially prevent muddy water or similar ambient outdoor fluids from being splashed on a supplemental air cleaner case.

In the supplemental air cleaner layout structure for an all-terrain vehicle according to a first aspect hereof, the supplemental air cleaner is disposed above the internal combustion engine and above and anterior to the carburetor and the main air cleaner. The supplemental air cleaner is covered from below with these internal combustion engine, carburetor, and main air cleaner. As a result, muddy water or the like splashed up from a road surface can be substantially blocked by the internal combustion engine, the carburetor, and the main air cleaner, and the supplemental air cleaner can be substantially prevented from being exposed to muddy water or other splashed fluids.

In the supplemental air cleaner layout structure for an all-terrain vehicle according to a second aspect hereof, the supplemental air cleaner is disposed behind the fuel tank and below the seat. The supplemental air cleaner is also covered from below with the internal combustion engine, carburetor, and main air cleaner, so that the supplemental air cleaner is covered also from the front and from above. As a result, a splash of muddy water or the like over the supplemental air cleaner can be prevented more reliably.

In the supplemental air cleaner layout structure for an all-terrain vehicle according to a third aspect hereof, the air intake is provided facing downwardly in a lower rear portion of the supplemental air cleaner. If the vehicle is stored in a vertical orientation during periods of non-use, by standing it against a wall with the front portion of the vehicle facing upward and the rear portion thereof facing downward, any splashed fluid that has intruded into the supplemental air cleaner is more easily drained to the outside by allowing the splashed fluid to drain from the lower rear portion of the supplemental air cleaner through the air intake.

In an all-terrain vehicle in which a fuel tank and a seat are mounted above a body frame, an internal combustion engine is mounted on a lower portion of the body frame, a carburetor is attached to the internal combustion engine, and a main air cleaner, for filtering an air to be supplied to the internal combustion engine, is attached to the carburetor. The carburetor is provided with an air passage for exerting an atmospheric pressure on fuel in a float chamber therein, and a supplemental air cleaner is provided additionally on an end portion of the air passage. The supplemental air cleaner is disposed above the internal combustion engine, and above and anterior to the carburetor and the main air cleaner.

Since the supplemental air cleaner is placed above the internal combustion engine and above and anterior to the carburetor and the main air cleaner, the supplemental air cleaner is covered from below with these internal combustion engine, carburetor, and main air cleaner, so that fluids splashed up from a road surface can be substantially blocked by the internal combustion engine, the carburetor, and the main air cleaner. In this way, the supplemental air cleaner is substantially prevented from being exposed to muddy water or similar splashed fluids.

In another aspect of the invention, the supplemental air cleaner is disposed behind the fuel tank and below the seat.

Since the supplemental air cleaner is disposed behind the fuel tank and below the seat, the supplemental air cleaner is covered not only from below but also from the front and from above, so that a splash of the muddy water or the like over the supplemental air cleaner is more reliably prevented.

In another aspect of the invention, the supplemental air cleaner has an air intake provided facing downwardly in a lower rear portion thereof.

In the case of storing the all-terrain vehicle by standing it substantially vertically against a wall with the front side of the vehicle facing upward and the rear side thereof facing downward, any muddy water or the like that has intruded into the supplemental air cleaner is more easily drained to the outside.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

Herein, only structures considered necessary for clarifying the present invention are described. Other conventional structures, and those of ancillary and auxiliary components of the system, are assumed to be known and understood by those skilled in the art.

Referring to the accompanying drawings, selected illustrative embodiments of the present invention will be described herein.

Figure 1:
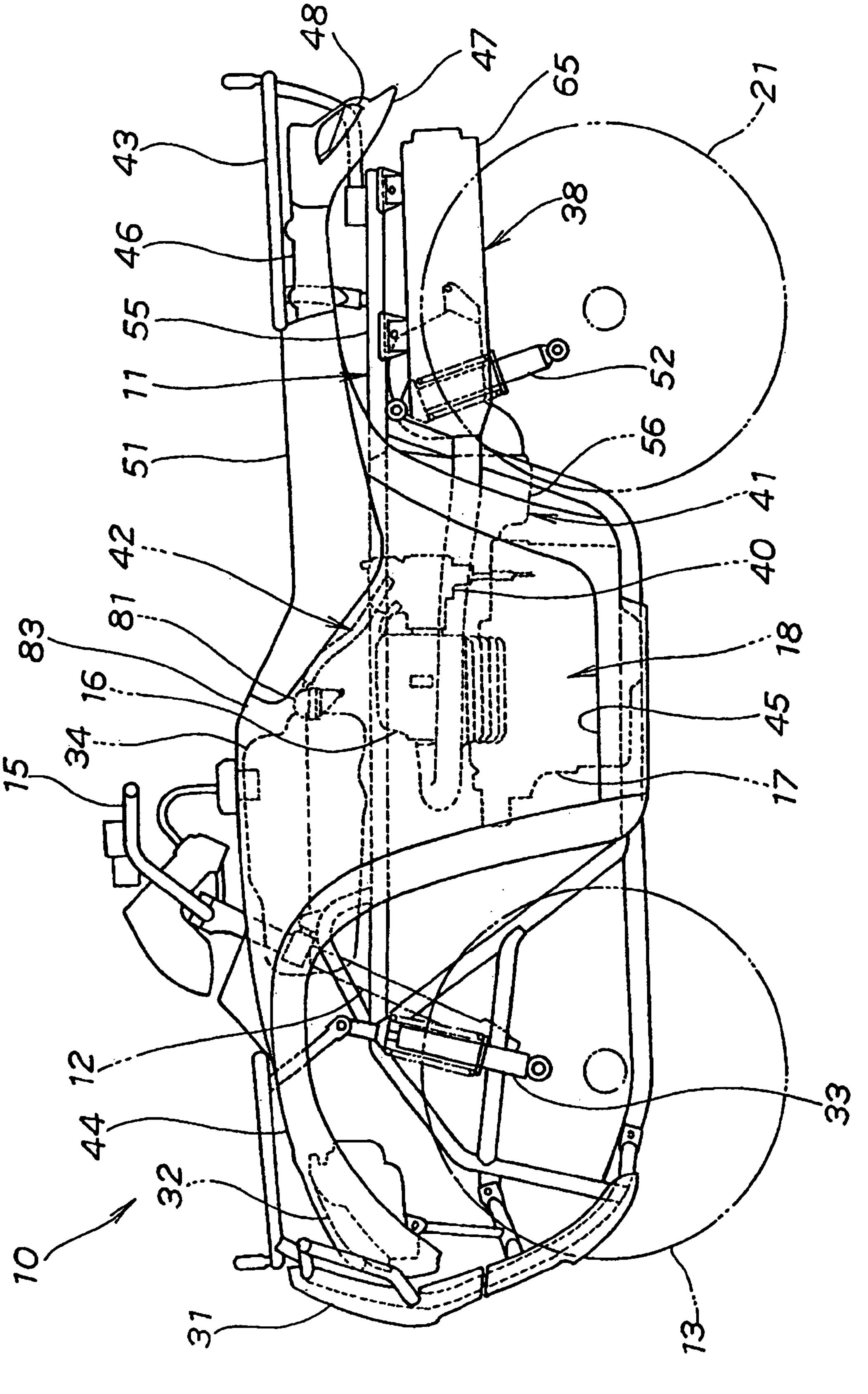
FIG. 1 is a side view of a vehicle comprising a supplemental air cleaner according to a selected illustrative embodiment of the present invention.

FIG. 1 is a side view of a vehicle 10 including a supplemental air cleaner according to the present invention. The vehicle 10 is an all-terrain vehicle for off-road use on uneven ground, and includes a body frame 11 having a number of body components mounted thereto.

A steering shaft 12 is mounted on a front portion of the body frame 11, and the lower end portion of the steering shaft 12 is operatively connected to left and right front wheels 13 and 14. A handle bar 15 is fixedly mounted on the upper end portion of the steering shaft 12, so that an operator can control the position of the front wheels 13, 14 via movement of the handle bar. A handle bar support member 53 (FIG. 2) is mounted on the upper portion of the steering shaft 12, and the handle bar 15 is mounted on the handle support member 53 via clamps 54.

A powertrain 18, including an engine 16 and a transmission 17, is mounted on the middle portion of the body frame 1 1, and the powertrain operates to drive the front wheels 13 and 14 as well as the rear wheels 21 and 22.

Other components which are provided on the vehicle 10 include a front guard 31 which protects the front face of the body, head lamps 32, front and rear shock absorbers 33 and 52, respectively, and a fuel tank 34 mounted on the body frame 11. An exhaust unit 38 is also provided connected to the front portion of the engine 16, and is then bent and extended rearwardly.

A carburetor 40 is provided connected to the rear portion of the engine 16, and an air cleaner unit 41 is attached to the rear portion of the carburetor 40. An air vent unit 42 (including a supplemental air cleaner which will be described later) extends upwardly away from the carburetor 40, and includes an air passage for allowing ambient atmospheric pressure to be communicated therethrough and exerted on the fuel in a float chamber of the carburetor 40.

Further components of the vehicle include a rear carrier 43 for carrying luggage, front fenders 44 for covering the front wheels 13 and 14, rear fenders 46 for covering the rear wheels 21 and 22, mud guards 47 attached to the rear fenders 46, tail lamps 48 attached to the mud guards 47, a seat 51, and steps 45, on which a driver rests his or her legs.

Figure 2:
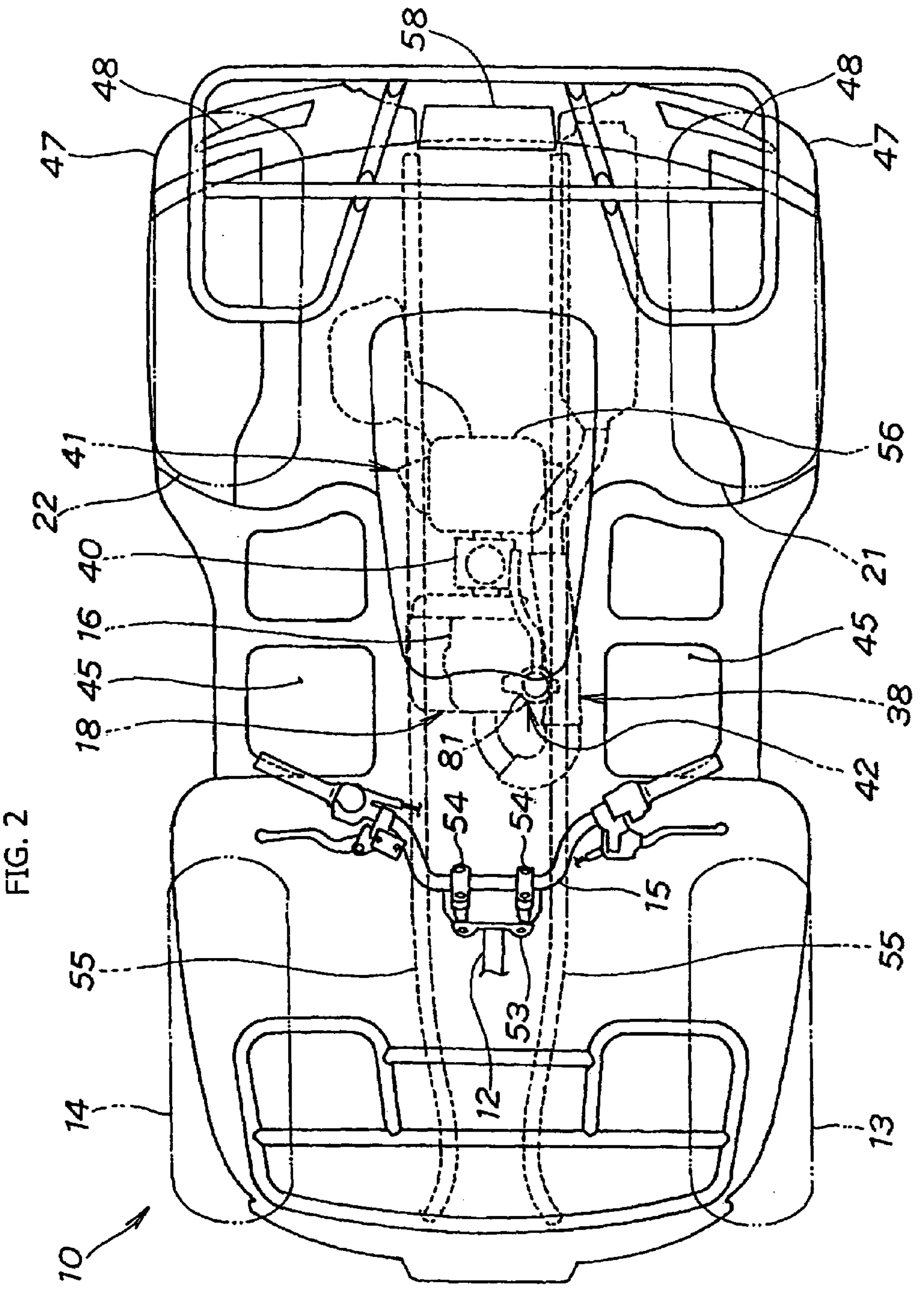
FIG. 2 is a top plan view of the vehicle of FIG. 1.

FIG. 2 is a top plan view of the vehicle of FIG. 1. Left and right main frame sections 55R and 55L, composing a part of the body frame 11, are disposed proximate the center portion of the body to extend in a front-to-rear direction.

The powertrain 18, the carburetor 40, and a main air cleaner 56 of the air cleaner unit 41 are disposed between the main frame sections 55R and 55L, and the exhaust unit 38 is bent into a U-shaped configuration from the engine 16 and extended rearwardly below the main frame sections, as shown in FIG. 1.

It is further shown that the mudguards 47, 47 are disposed on the left and right portions of the body with a license plate 58 interposed therebetween.

Figure 3:
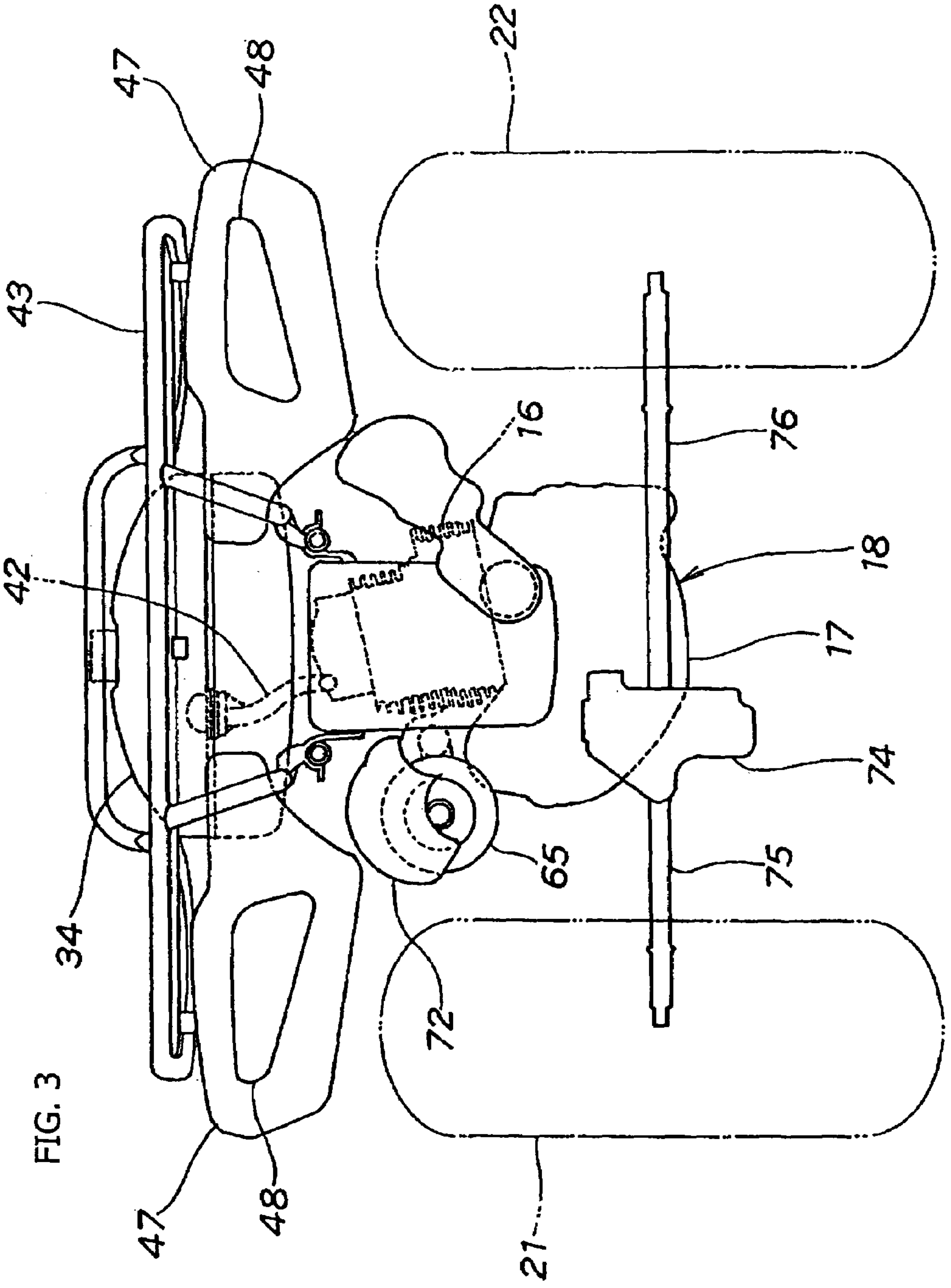
FIG. 3 is a rear plan view of the vehicle of FIG. 1.

FIG. 3 is a rear plan view of the vehicle 10, which illustrates a tail lamp 48 disposed substantially at the center of each of the mud guards 47, 47, and also shows the air vent unit 42 extending upwardly from the carburetor 40 (see also FIG. 1). In the drawing, a heat shielding plate 72 is shown covering the upper and side portions of a silencer 65 of the exhaust unit 38. A final reduction gear unit 74 for the rear wheels 21 and 22 can also be seen in FIG. 3, and respective axle shafts 75 and 76 extend from the final reduction gear unit 74 toward the left and right rear wheels 21 and 22, to transmit power thereto.

Figure 4:
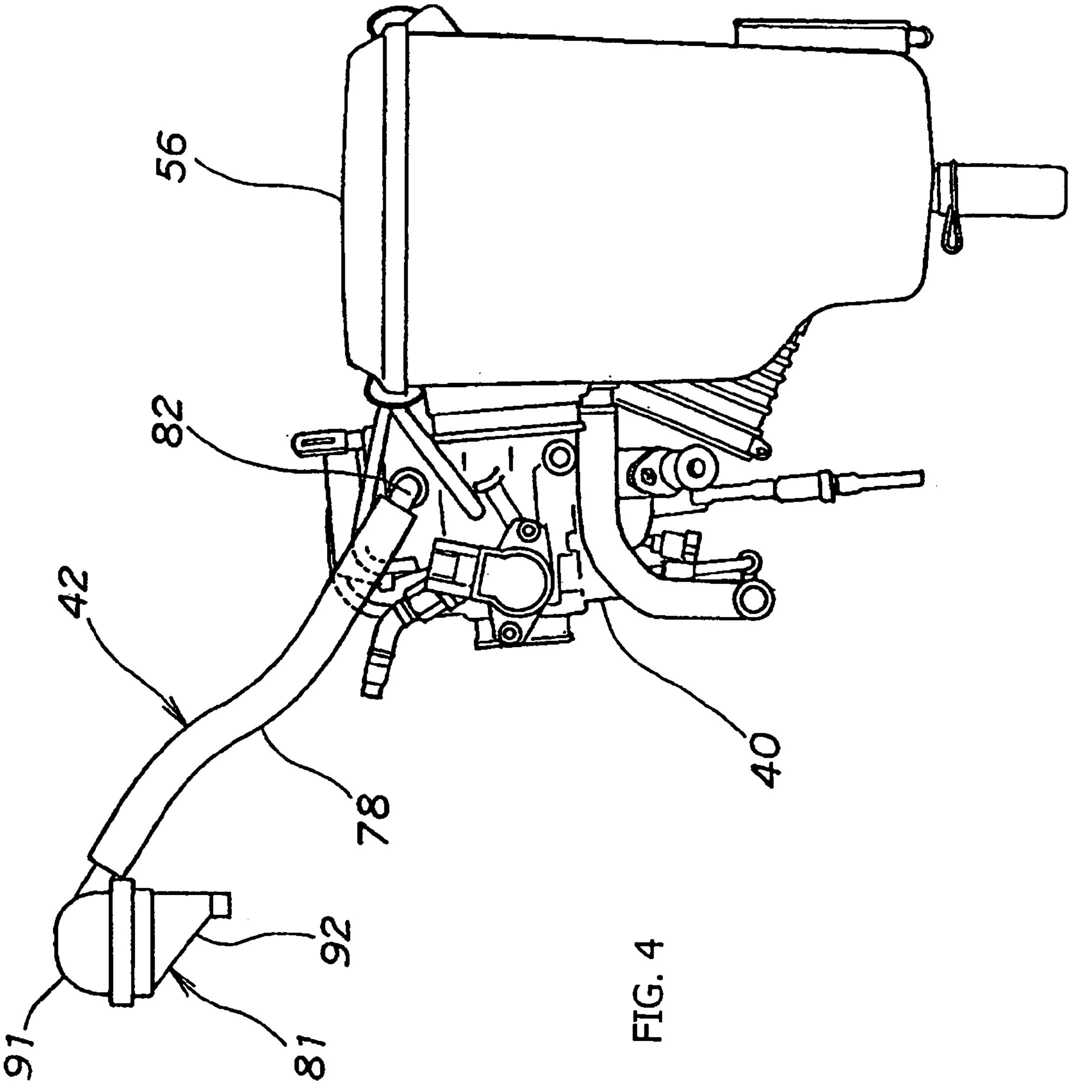
FIG. 4 is a side view illustrating a carburetor, an air cleaner unit, and air vent unit which are situated on the vehicle of FIG. 1.

FIG. 4 is a side plan view illustrating the carburetor 40, the air cleaner unit 41, and the air vent unit 42 according to the first embodiment of the present invention, which shows that the air vent unit extends forwardly and obliquely upwardly from the side surface of the carburetor.

The air vent unit 42 includes a tube 78, having one end connected to an inlet pipe 82 provided in the upper portion of the carburetor 40, and the other end attached to the supplemental air cleaner 81. The inlet pipe 82 serves as the entrance of a passage connected to a float chamber (not shown) provided in the lower portion of the carburetor 40. In this way, the supplemental air cleaner 81, the passage in the air vent unit 42, the inlet pipe 82, and the float chamber of the carburetor 40 are in fluid communication with one another, to exert an ambient atmospheric pressure on the fuel reserved in the float chamber.

The supplemental air cleaner 81 is provided to substantially prevent dust from entering the carburetor 40 via the air vent unit 42, which is disposed above the carburetor 40 and also above the engine 16, behind the fuel tank 34, and below the front portion of the seat 51, as shown in FIG. 1. Briefly, the supplemental air cleaner 81 is surrounded by the engine 16, the fuel tank 34, and the seat 51 and also covered with a body cover 83, covering the engine above the fuel tank 34 and in front of the seat 51.

Consequently, muddy water or the like, splashed up from a road or trail surface, is substantially prevented from entering the supplemental air cleaner 81, because it is protectively blocked by the engine 16, the transmission 17, the fuel tank 34, the seat 51, the body cover 83, and other surrounding components of the vehicle 10. Accordingly, the supplemental air cleaner 81 is substantially protected from being exposed to the muddy water or the like.

Figure 5:
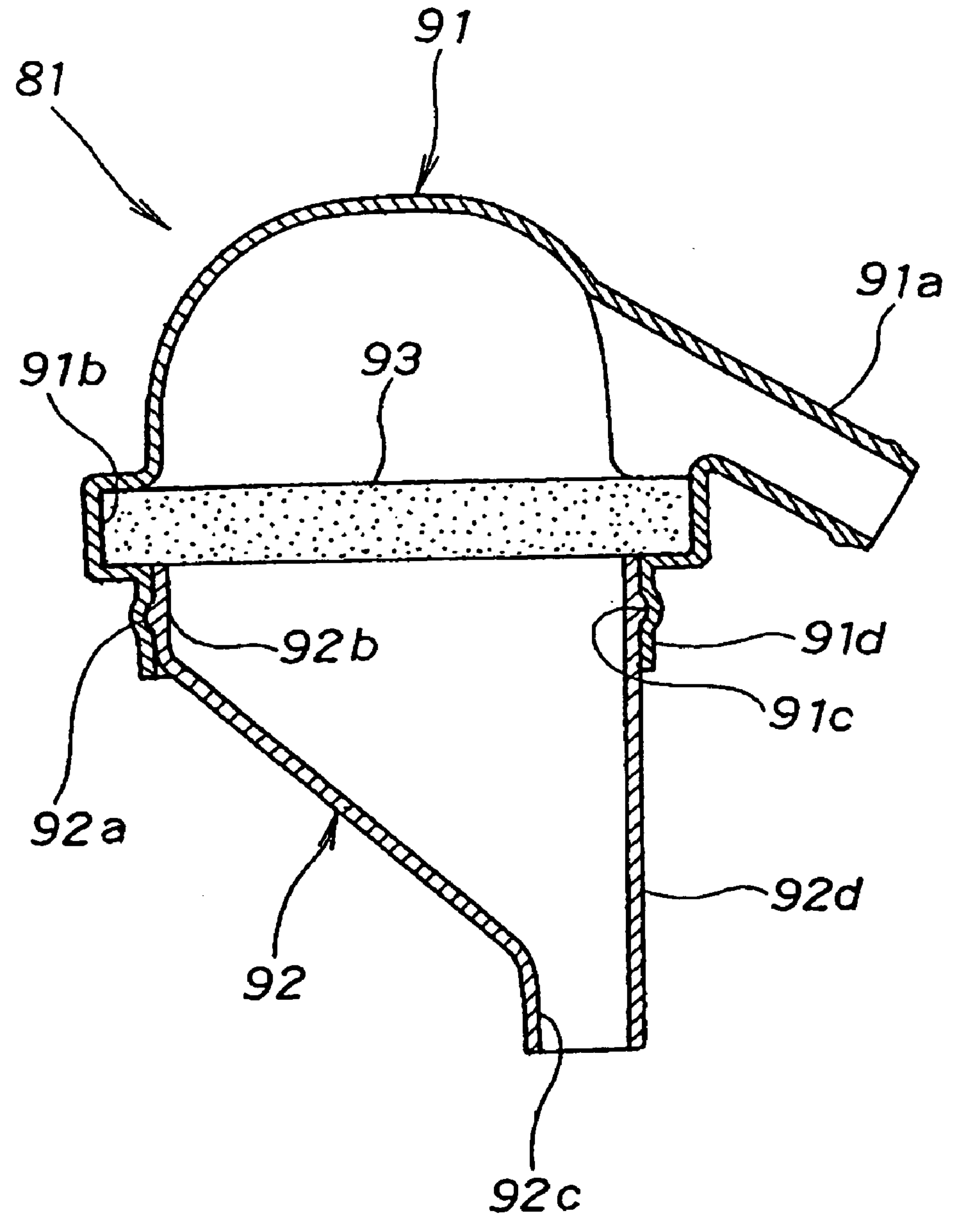
FIG. 5 is a cross-sectional view of the supplemental air cleaner according to the first embodiment of the present invention.

FIG. 5 is a cross-sectional view of the supplemental air cleaner according to the first embodiment of the present invention. The supplemental air cleaner 81 includes a generally dome-shaped case 91 with an outlet pipe 91_a_ integrally formed thereon for connecting to the tube 78 (see FIG. 4). The supplemental air cleaner also includes a generally funnel-shaped intake port 92 which attaches to the lower portion of the case 91, and a filter 93 placed in the case 91. The filter 93 is formed from a porous material.

The case 91 also includes a filter storing portion 91_b_ formed as a cylindrical space for storing the filter 93, and a cylindrical connecting portion 91_d_ formed with an annular groove 91_c_ to be engaged with the intake port 92.

The intake port 92 is a generally funnel-shaped member, including an engagement portion 92_b_ at an upper end thereof, formed with an annular rib 92_a_ extending therearound for engagement with the inside of the cylindrical portion 91_d_ of the case 91. The intake port 92 also includes an air intake tube 92_c_ provided to face downwardly, and in biased relation toward the rear part of the body (right side of the drawing). 92_d_ denotes the rear wall of the intake port 92.

A description of the operation of the supplemental air cleaner 81 described above will be given next.

Figure 6B:
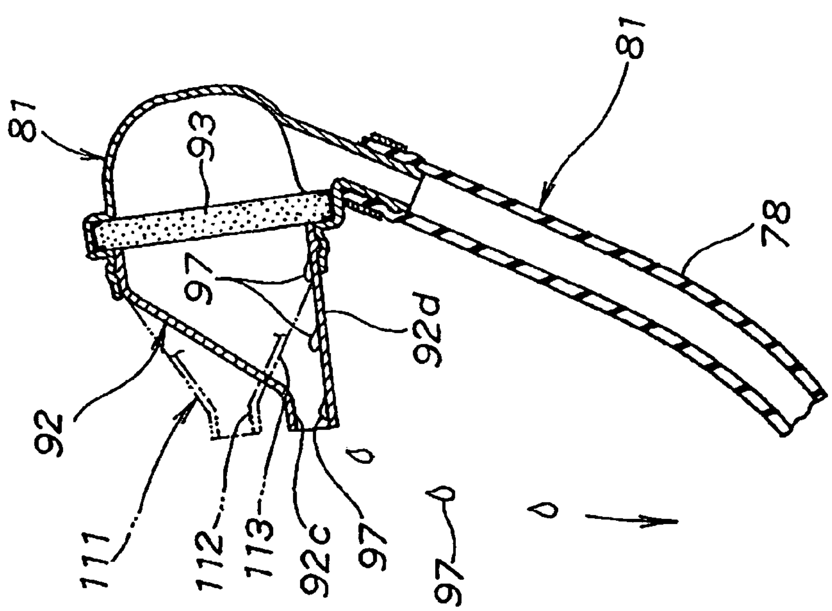
FIG. 6 is an operational view showing the operation of the supplemental air cleaner according to the first embodiment of the present invention.
Figure 6A:
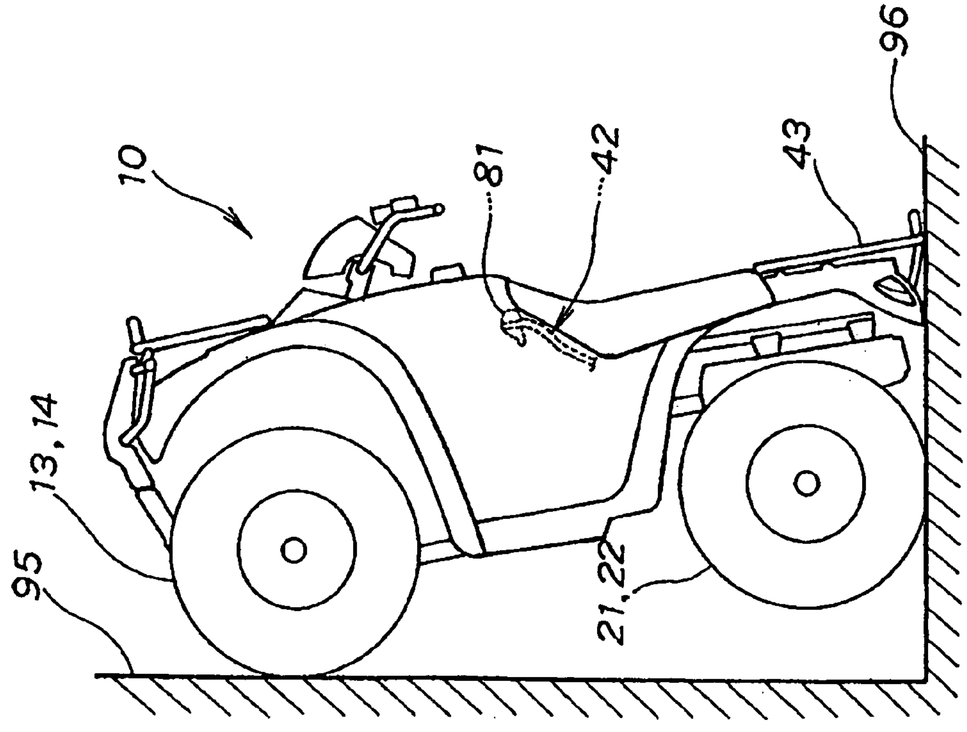
Figure 7:
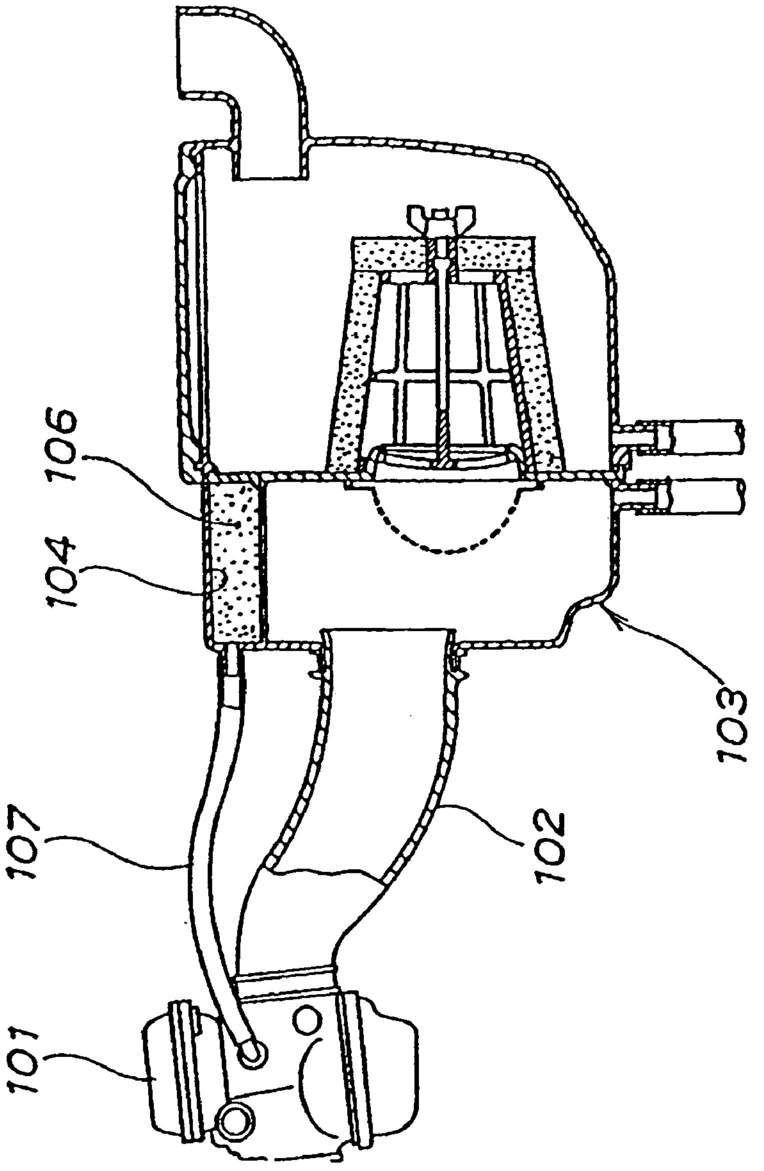
FIG. 7 is a cross-sectional view, partly in side plan view, showing a conventional supplemental air cleaner layout structure from the prior art.

FIGS. 6(_a_) and 6(_b_) are operational views showing the operation of the supplemental air cleaner according to the present invention.

FIG. 6(_a_) shows a state in which the vehicle 10 is stood against a wall 95 during storage thereof. In preparation for storing the vehicle 10, the front portion of the vehicle is raised by using an elevator (not shown), and the front wheels 13 and 14 are rested against a vertical wall 95. The rear wheels 21 and 22 and a rear luggage carrier 43 are placed into contact with the ground 96.

FIG. 6(_b_) is a cross-sectional view showing the air vent unit 42 in the stored state depicted in FIG. 6(_a_). Even when the vehicle 10 is stored with muddy water 97 left in the intake port 92 of the supplemental air cleaner 81, e.g., the muddy water 97 can be drained to the outside by the inclined rear wall 92_d_ of the intake port.

An intake port 111 according to a comparative example indicated by the phantom line in FIG. 6(_b_) has an air intake 112 provided in the center thereof. Since such an intake port 111 has a rear wall 113 of which the part closer to the air intake 112 is positioned higher in level than the part closer to the filter 93, the muddy water left in the intake port 111 cannot be drained outwardly from the intake port 111.

As thus described above with reference to FIG. 1, the present invention is provided for use in an all-terrain type vehicle 10 for off-road use on uneven ground, in which the fuel tank 34 and the seat 51 are mounted above the body frame 11 in a front-to-rear direction.

In the vehicle 10, the engine 16 is mounted on a lower portion of the body frame 11, the carburetor 40 is attached to the engine 16, and the main air cleaner 56, for filtering engine air, is attached to the carburetor 40. The carburetor 40 is provided with the air vent unit 42 for exerting ambient atmospheric pressure on fuel in the carburetor's internal float chamber.

The supplemental air cleaner 81 is provided additionally in fluid communication with the air vent unit 42. The supplemental air cleaner 81 is disposed above the engine 16, and above and anterior to the carburetor 40 and the main air cleaner 56.

Since the supplemental air cleaner 81 is disposed above the engine 16, and above and anterior to the carburetor 40 and the main air cleaner 56, the supplemental air cleaner 81 is substantially protected by the engine 16, carburetor 40, and main air cleaner 56. As a result, muddy water or the like, splashed up from a road or trail surface, can be blocked by the engine 16, the carburetor 40, and the main air cleaner 56, so that the supplemental air cleaner 81 is substantially prevented from being exposed to the muddy water or the like.

The supplemental air cleaner 81 is disposed behind the fuel tank 34 and below the seat 51.

Since the supplemental air cleaner 81 is disposed behind the fuel tank 34 and below the seat 51, the supplemental air cleaner 81 is covered not only from below but also from the front and from above, so that a splash of the muddy water or the like over the supplemental air cleaner 81 is more reliably prevented.

The supplemental air cleaner 81 has the air intake 92_c_ provided in the lower rear portion thereof to face downward, as described with reference to FIG. 5.

In the case of storing the vehicle 10 by standing it against a wall 95 with the front portion facing upwardly and the rear portion facing downwardly, any muddy water or the like that has intruded into the supplemental air cleaner 81 is easily drained to the outside. The fluid is allowed to drain from the lower rear portion of the supplemental air cleaner 81, i.e., along the rear wall 92_d_ and outwardly through the air intake 92_c_.

Although the present invention has been described herein with respect to a limited number of presently embodiments, the foregoing description is intended to be illustrative, not restrictive. Those skilled in the art will realize that many modifications of the preferred embodiment could be made which would be operable. All such modifications, which are within the scope of the claims, are intended to be within the scope and spirit of the present invention.

Having thus, described the invention, what is claimed is:

1. A supplemental air cleaner layout structure for an all-terrain vehicle, in which a fuel tank and a seat are mounted above a body frame in a front-to-rear direction in this order, an internal combustion engine is mounted on a lower portion of the body frame, a carburetor is attached to the internal combustion engine, a main air cleaner for filtering an air to be supplied to the internal combustion engine is attached to the carburetor, while the carburetor is provided with an air passage for exerting an atmospheric pressure on a level of a fuel in a float chamber of the carburetor, and a supplemental air cleaner is provided additionally on an end portion of the air passage, said supplemental air cleaner being characterized in that it is disposed above said internal combustion engine, and above and anterior to said carburetor and said main air cleaner.

2. An all-terrain vehicle, comprising:

a frame body, a fuel tank mounted to the frame body;

a seat mounted to the frame body;

an internal combustion engine mounted on the frame body and comprising a carburetor;

a main air cleaner operatively connected to said carburetor;

an air vent passage for exerting atmospheric pressure on the level of fuel in a float chamber of said carburetor; and a supplemental air cleaner disposed above said internal combustion engine, and above and anterior to said carburetor and said main air cleaner, said supplemental air cleaner being in fluid communication with said air vent passage;

whereby said supplemental air cleaner is substantially protected from upward ambient fluid splash by said engine, said carburetor, and said main air cleaner.

3. The supplemental air cleaner layout structure according to claim 1, wherein said supplemental air cleaner is disposed behind said fuel tank and below the seat.

4. A supplemental air cleaner apparatus according to claim 2, wherein said supplemental air cleaner is disposed behind the fuel tank and below the seat.

5. A supplemental air cleaner apparatus according to claim 2, wherein said supplemental air cleaner comprises a substantially funnel-shaped intake port having a wide top portion and a narrow bottom portion comprising an inlet tube located substantially below a side edge of said top portion.

6. A supplemental air cleaner layout structure according to claim 1, wherein said supplemental air cleaner has an air intake provided facing downwardly in a lower rear portion thereof.

7. A supplemental air cleaner apparatus according to claim 6, wherein said supplemental air cleaner apparatus further comprises an air intake tube which faces downwardly, and in biased relation toward the rear part of the body frame.

8. A supplemental air cleaner apparatus for use on an all-terrain vehicle, the all-terrain vehicle having a main air cleaner apparatus separate and independent of the supplemental air cleaner apparatus, said supplemental air cleaner apparatus comprising:

a substantially dome-shaped case with an outlet pipe integrally formed thereon;

a porous filter that fits inside of the case;

a substantially funnel-shaped intake port which attaches to a lower portion of the case.

9. The air cleaner apparatus of claim 8, wherein the case includes a substantially cylindrical filter storing portion for storing the filter, and a connecting portion formed with an annular groove therearound.

10. The air cleaner apparatus of claim 8, wherein the intake port comprises a wide top portion and a narrow bottom portion comprising an inlet tube located substantially below a side edge of said top portion.

11. A supplemental air cleaner apparatus for use on an all-terrain vehicle, said supplemental air cleaner apparatus comprising:

a substantially dome-shaped case with an outlet pipe integrally formed thereon;

a porous filter that fits inside of the case; and a substantially funnel-shaped intake port which attaches to a lower portion of the case, wherein the intake port is a substantially funnel-shaped member, including an engagement portion at an upper end thereof, formed with an annular rib extending therearound for engagement with the inside of the case.

* * * * *